United States Patent [19]

Sugama

[11] Patent Number: 5,200,237
[45] Date of Patent: Apr. 6, 1993

[54] SOLID-GEL PRECURSOR SOLUTIONS AND METHODS FOR THE FABRICATION OF POLYMETALLICSILOXANE COATING FILMS

[75] Inventor: Toshifumi Sugama, Mastic Beach, N.Y.

[73] Assignee: Associated Universities, Inc., Washington, D.C.

[21] Appl. No.: 783,169

[22] Filed: Oct. 28, 1991

Related U.S. Application Data

[62] Division of Ser. No. 590,770, Oct. 1, 1990, Pat. No. 5,110,863.

[51] Int. Cl.⁵ .............................................. B05D 3/02
[52] U.S. Cl. ..................................... 427/380; 427/387
[58] Field of Search .............. 427/380, 387; 524/767; 528/25, 40, 41

[56] References Cited

U.S. PATENT DOCUMENTS

| | | | |
|---|---|---|---|
| 4,028,085 | 6/1977 | Thomas | 65/134 |
| 4,347,347 | 8/1982 | Yajima et al. | 528/30 |
| 4,455,414 | 6/1984 | Yajima et al. | 528/30 |
| 4,584,280 | 4/1986 | Nanao et al. | 501/80 |
| 4,786,618 | 11/1988 | Shoup | 501/12 |
| 4,880,851 | 11/1989 | Yamamoto | 523/102 |
| 4,886,685 | 12/1989 | Wegner et al. | 427/430.1 |
| 4,948,843 | 8/1990 | Roberts et al. | 525/328.2 |

*Primary Examiner*—Michael Lusigan
*Attorney, Agent, or Firm*—Margaret C. Bogosian

[57] ABSTRACT

Solutions and preparation methods necessary for the fabrication of metal oxide cross-linked polysiloxane coating films are disclosed. The films are useful in provide heat resistance against oxidation, wear resistance, thermal insulation, and corrosion resistance of substrates. The sol-gel precursor solution comprises a mixture of a monomeric organoalkoxysilane, a metal alkoxide $M(OR)_n$ (wherein M is Ti, Zr, Ge or Al; R is $CH_3$, $C_2H_5$ or $C_3H_7$; and n is 3 or 4), methanol, water, HCl and NaOH. The invention provides a sol-gel solution, and a method of use thereof, which can be applied and processed at low temperatures (i.e., <1000° C.). The substrate can be coated by immersing it in the above mentioned solution at ambient temperature. The substrate is then withdrawn from the solution. Next, the coated substrate is heated for a time sufficient and at a temperature sufficient to yield a solid coating. The coated substrate is then heated for a time sufficient, and temperature sufficient to produce a polymetallicsiloxane coating.

15 Claims, 11 Drawing Sheets

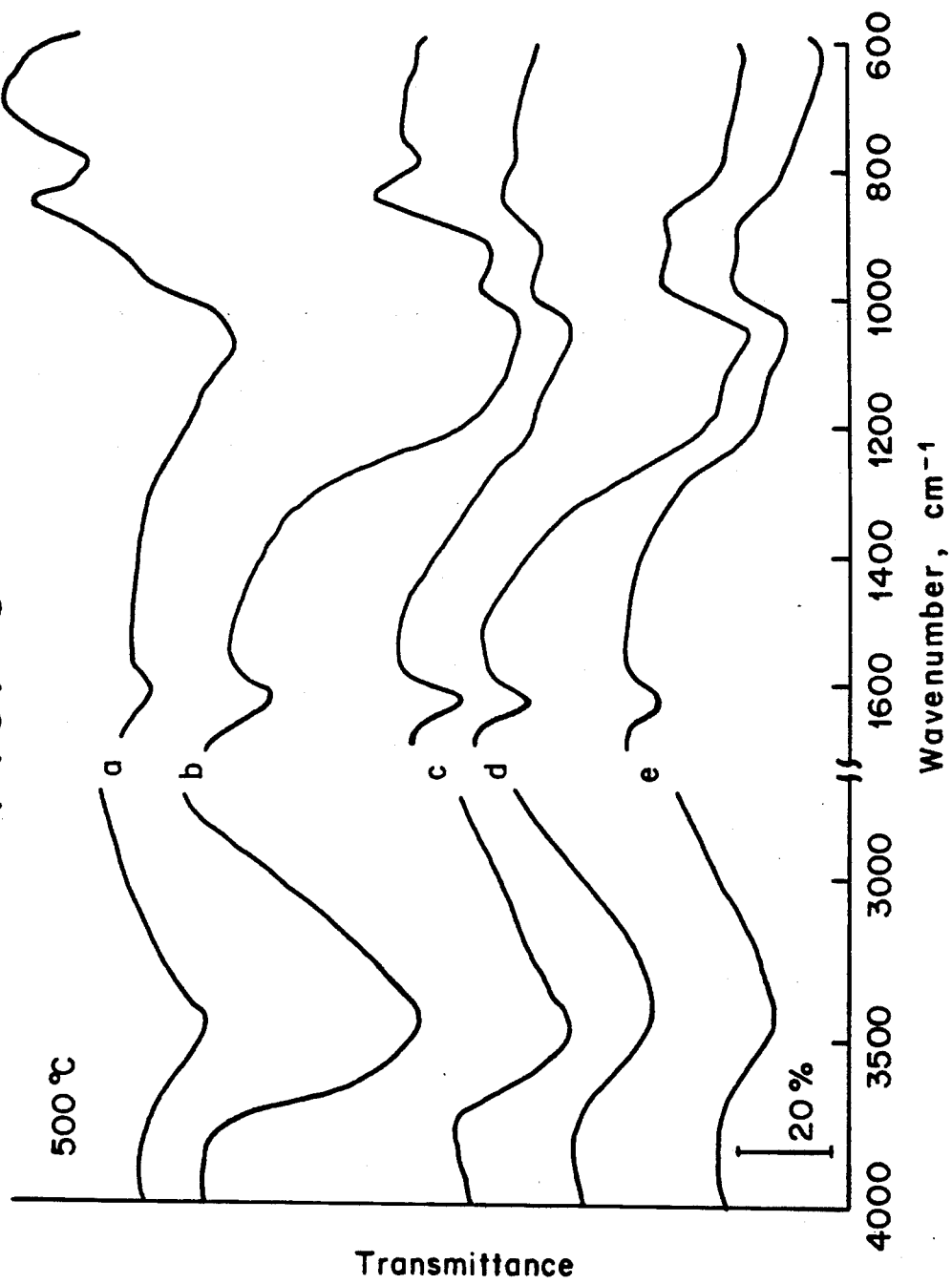

SOLID-GEL PRECURSOR SOLUTIONS AND METHODS FOR THE FABRICATION OF POLYMETALLICSILOXANE COATING FILMS

This invention was made with Government support under contract number DE-AC02-76CH00016, between the U.S. Department of Energy and Associated Universities, Inc. The Government has certain rights in the invention.

This is a division of co-pending application Ser. No. 590,770 filed Oct. 1, 1990, now U.S. Pat. No. 5,110,863.

BACKGROUND OF THE INVENTION

The present invention includes solutions and the preparation methods necessary for the fabrication of metal oxide cross-linked polysiloxane coating films which are useful in providing heat resistance against oxidation, wear resistance, thermal insulation, and corrosion resistance of substrates.

In the past, ceramic coatings on metallic and plastic substrates have not been widely used primarily because many ceramic coatings can be applied and processed only at high temperatures (i.e., only at temperatures above 1000° C.) using expensive and time-consuming methods such as chemical vapor deposition. Therefore, aluminum alloys, plastics and other materials with low melting points were not easily protected.

U.S. Pat. No. 4,584,280 to Nanao discloses a process for preparing a porous ceramic film by applying an anhydrous solution containing an organometallic compound and a multifunctional organic compound to a substrate and thermally decomposing the substrate. The organometallic compound may be titanium alkoxide. Examples of the multifunctional organic compound include such organic compounds as glycerine, 1,4-butenediol, pentaerythritol, dextrin, arginic acid, methyl cellulose, ethyl cellulose, hydroxyethyl cellulose, carboxymethyl cellulose, carboxymethyl starch, hydroxyethyl starch, polyvinylalcohol, and mixtures thereof. The thermal decomposition is conducted at a temperature of not less than 200° C., and then, if necessary, the coated substrate is baked. Nanao does not teach the formation of a polymetallicsiloxane film at low temperatures as does the present invention.

U.S. Pat. Nos. 4,455,414 and 4,347,347, to Yajima, et al. disclose an organic copolymer composed of a polycarbosilane portion and a polymetallicsiloxane portion cross-linked with each other and the process of making it. Neither patent teaches the formation of a polymetallicsiloxane film at low temperature as does the present invention.

U.S. Pat. No. 4,028,085 to Thomas discloses the combination of a hydrolyzable metal alkoxide with a partially hydrolyzed silicon tetraalkoxide to form a metallicsiloxane solution. Thomas does not teach the application of the solution to a substrate nor does it teach the heating of the solution to create a ceramic-type polymetallicsiloxane coating.

It is, therefore, an object of the present invention to provide a polymetallicsiloxane sol-gel precursor solution which can be used in the preparation of metal oxide cross-linked polysiloxane coating films which are useful in providing heat resistance against oxidation, wear resistance, thermal insulation, and corrosion resistance of substrates.

It is an object of the invention to provide a sol-gel solution, and a method of use thereof, which can be applied and processed at low temperatures (i.e., at temperatures of less than 1000° C.).

A further object of the invention is to provide a polymetallicsiloxane sol-gel precursor solution which will adhere well and have an appropriate expansion coefficient, especially during temperature cycling, so that separation of the coating film from the substrate will not occur.

BRIEF DESCRIPTION OF THE INVENTION

This invention relates to the formulation of sol-gel precursor solutions and the preparation methods necessary for the fabrication of the metal oxide cross-linked polysiloxane coating films. The metal oxide cross-linked polysiloxane coating film enhances heat resistance against oxidation, wear resistance, thermal insulation and corrosion resistance of substrates such as aluminum, steel, magnesium, and titanium. The sol-gel precursor solution includes a mixture of a monomeric organoalkoxysilane, a metal alkoxide $M(OR)_n$ (wherein M is a transition metal; R is $CH_3$, $C_2H_5$ or $C_3H_7$; and n is 3 or 4), alcohol, water and a chlorine containing acid. Suitably M can include Ti, Zr, Ge and Al. Preferably the alcohol is methanol, ethanol or propanol. The invention provides a sol-gel solution, which can be applied and processed at low temperatures (i.e., <1000° C.). Preferably, NaOH is used to adjust the pH of the solution to about 7.5.

Preferably, the monomeric organoalkoxysilane is selected from the group consisting of N[3-(triethoxysilyl) propyl]imidazole (TSPI) and N[3-triethoxysilyl)-propyl]-4,5-dihydroimidazole (TSPDI). In a preferred embodiment the amount of HCl is sufficient to provide a clear solution and acts as a hydrolysis accelerator. In another preferred embodiment the ratio of imidazole containing monomeric organoalkoxysilane to metal alkoxide is in the range of about 80/20 to about 50/50 by weight (i.e., the solution comprises 18–35 wt % TSPI or TSPDI, 9–18 wt % $Ti(OC_2H_5)4$, 21–26 wt % methanol, 13–29 wt % HCl and 14–17 wt % water). The sol-gel solution is miscible with water and the thickness of the coating films can be adjusted by adding an appropriate amount of water to the solution.

The substrate can be coated by immersing it in the above mentioned solution at ambient temperature. The substrate is then withdrawn from the solution. Next, the coated substrate is heated for a time sufficient and at a temperature sufficient to yield a solid coating. The coated substrate is then heated for a time sufficient, and at a temperature sufficient, to produce a polymetallicsiloxane coating.

To date, ceramic coatings on metallic and plastic substrates have not been widely employed for several reasons. First, coatings must adhere well and have an appropriate expansion coefficient. This is especially true during temperature cycling, otherwise, separation of the coating film from the substrate will occur. Second, many ceramic coatings can be applied and processed as coatings only at high temperatures (i.e., >1000° C.) using expensive and time-consuming methods such as chemical vapor deposition. Therefore, the instant sol-gel solution, and the preparation methods for the formulation of metal oxide cross-linked polysiloxane coatings films, are advantageous in that they permit the application of an effective polymetallicsiloxane coating at a temperature which more easily permits the use of aluminum alloys and other low melting point materials.

For a better understanding of the invention, together with other and further objects, reference is made to the following description, and its scope will be pointed out in the appended claims.

BRIEF DESCRIPTION OF THE DRAWINGS

FIG. 3 details the IR absorption spectra for powder samples of various GPS/Ti(OC$_2$H$_5$)$_4$ ratios heated at 500° C.: a) 100/0; b) 80/20; c) 60/40; d) 40/60; and 3) 30/70.

FIG. 4a—100/0 and FIG. 4b—60/40.

FIG. 12a illustrates a 70/30 TSPI/Ti(OC$_3$H$_7$)$_4$ ratio system and FIG. 12b illustrates a 50/50 TSPI/Ti(OC$_3$H$_7$)$_4$ ratio systems.

DETAILED DESCRIPTION OF THE INVENTION

Figure 1:
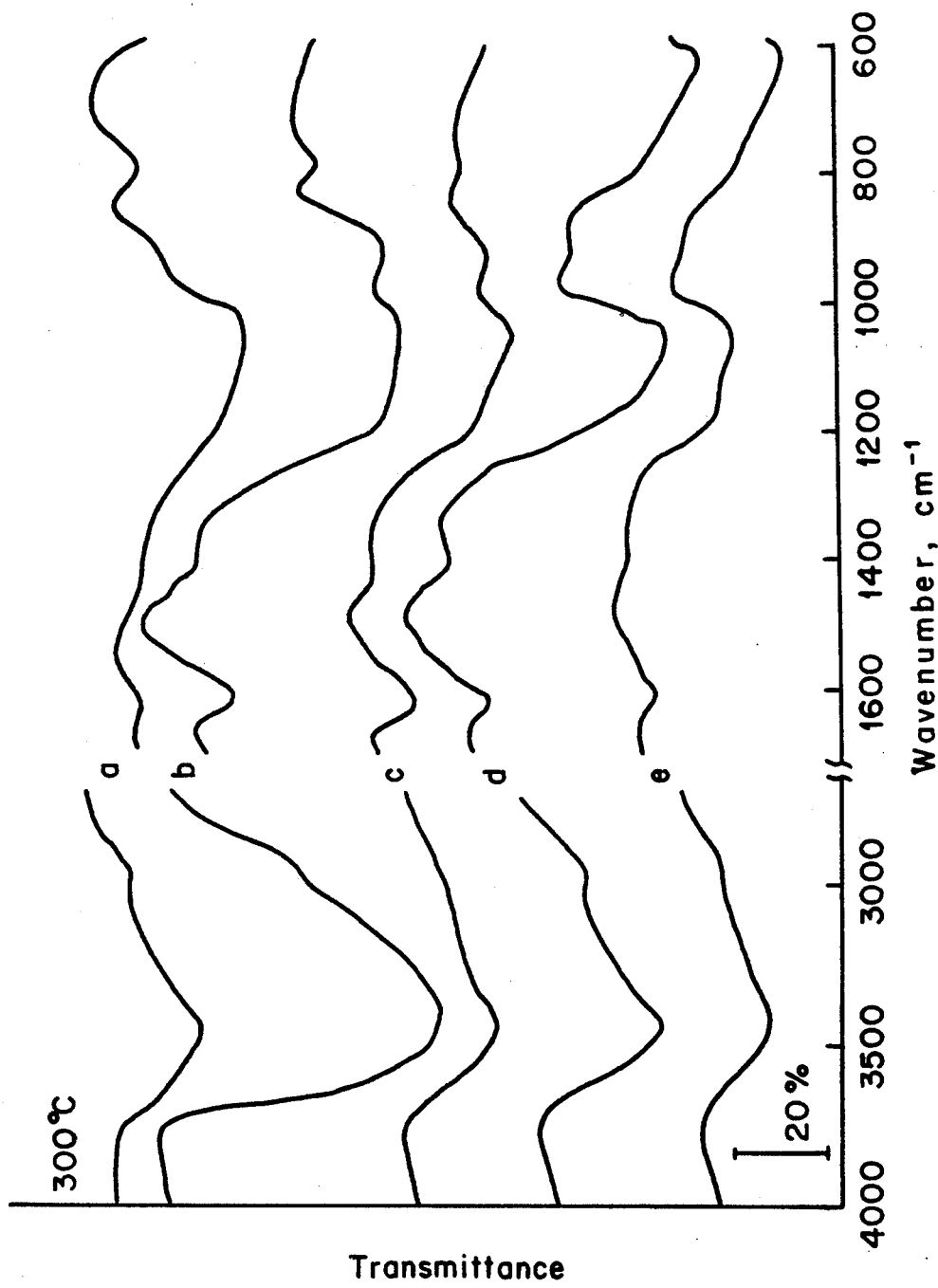
FIG. 1 illustrates the IR absorption spectra for powder samples of various GPS/Ti(OC$_2$H$_5$)$_4$ ratios heat treated at 300° C.: a) 100/0; b) 80/20; c) 60/40; d) 40/60 and e) 30/70.

The sol-gel precursor solution of the present invention includes a mixture of a monomeric organoalkoxysilane, a metal alkoxide M(OR)n (wherein M is a suitable transition metal); R is CH$_3$, C$_2$H$_5$ or C$_3$H$_7$; and n is 3 or 4), alcohol (such as methanol, ethanol or propanol), water, and a chlorine containing acid (such as HCl). Suitably, M may be Ti, Zr, Ge or Al. Preferably, the pH of the solution is adjusted to about 7.5 (for reasons of handling safety) by the addition of NaOH. Among the monomeric organoalkoxysilanes which can be used with the present invention are those listed in Table 1. In a preferred embodiment, the monomeric organoalkoxysilane contains an imidazole group, for example, N[3-(triethoxysilyl) propyl]-4,5 imidazole (TSPI) and N[3-triethoxysilyl)propyl]-4,5-dihydroimidazole (TSPDI).

TABLE 1

| Organosilane/Chemical Formula |
|---|
| 3-glycidoxypropyltrimethoxysilane (GPS) |
| CH$_2$—CH—CH$_2$—O—(CH$_2$)$_3$—Si(OCH$_3$)$_3$ <br> \\_O_/ |
| 3-aminopropyltrimethoxysilane (APS) <br> H$_2$N—(CH$_2$)$_3$—Si(OCH$_3$)$_3$ |
| N-[3-(triethoxysilyl)propyl]imidazole (TSPI) <br> ⎡‾‾\\ <br> ⎢  N—(CH$_2$)$_3$—Si(OC$_2$H$_5$)$_3$ <br> N =/ |
| N-[3-(triethoxysilyl)propyl]-4,5-dihydroimidazole (TSPDI) <br> ⎡‾‾\\ <br> ⎢  N—(CH$_2$)$_3$—Si(OC$_2$H$_5$)$_3$ <br> N =/ |

The film-forming precursor solution can be prepared by incorporating an organoalkoxysilane/metal alkoxide (M(OR)n wherein M is a suitable transition metal such as Ti, Zr, Ge or Al; R is CH$_3$, C$_2$H$_5$ or C$_3$H$_7$; and n is 3 or 4) into an alcohol/water mixing medium containing an appropriate amount of an acid containing chlorine. Suitably, the alcohol may be methanol, ethanol or propanol. Preferably, the acid is HCl. The acid acts as a hydrolysis accelerator and produces a clear precursor solution. The addition of the acid aids in the formation of a uniform coating film on the metal substrate. When the precursor solution is used as a coating material for a metal substrate, the pH of the solution is preferably adjusted to approximately 7.5 by the addition of an appropriate amount of a suitable base such as, for example KOH or NaOH. Prior to addition of the base, the solution will be very acidic (i.e., it will have a pH of from about 1.0 to about 3.5). The base makes the solution safer to handle.

The aluminum substrate used in the following examples was 2024-T3 clad aluminum sheet containing the following chemical constituents: 92 wt. % Al, 0.5 wt. % Si, 0.5 wt. % Fe, 4.5 wt. % Cu, 0.5 wt. % Mn, 1.5 wt. % Mg, 0.1 wt. % Cr, 0.25 wt. % Zn and 0.15 wt. % other elements.

The oxide etching of the aluminum was carried out in accordance with a well known commercial sequence called the Forest Products Laboratory (FPL) process. As the first step in the preparation, the surfaces were cleansed with acetone to remove any organic contamination. They were then immersed in chromic-sulfuric acid (Na$_2$Cr$_2$O$_7$.2H$_2$O: H$_2$SO$_4$:Water=4:23:73 by weight) for 10 min at 80° C. After etching, the fresh oxide surfaces were washed with deionized water at 30° C. for 5 min, and subsequently dried for 15 min at 50° C.

The substrate can be coated by immersing it in the above mentioned solution at ambient temperature. The substrate is then withdrawn from the solution. Next, the coated substrate is heated for a time sufficient and at a temperature sufficient to yield a solid coating. The coated substrate is then heated for a time sufficient, and at a temperature sufficient, to produce a polymetallicsiloxane coating.

A thinner polymetallicsiloxane coating may be obtained by diluting the sol-gel precursor solution with water.

Ti(OC$_2$H$_5$)$_4$-Modified GPS System

Coating of the aluminum surfaces using the sol-gel system was performed in accordance with the following sequence. First, the FPL-etched aluminum substrate was immersed in the precursor solution at ambient temperature. The substrate was then withdrawn slowly from the soaking bath, after which the substrate was heated for 20 hrs. at a temperature of 100° C. to yield a solid coating. The samples were subsequently heated for 20 min. at temperatures ranging from 200° to 500° C.

The mix compositions for the GPS/Ti(OC$_2$H$_5$)$_4$ based precursor solution systems are given in Table 2. For each formulation, the GPS to Ti(OC$_2$H$_5$)$_4$ ratio was varied so that the concentration of HCl needed to produce a clear precursor solution was dependent mainly on the GPS/Ti(OC$_2$H$_5$)$_4$ ratio. As the proportion of Ti(OC$_2$H$_5$)$_4$ increased, the required amount of HCl was increased to form Ti compounds which were susceptible to hydrolysis. The HCl-catalyzed hydrolysis of Ti-(OC$_2$H$_5$)$_4$ is as follows:

$$\equiv Ti-OC_2H_5 + H^+ + Cl^- \rightarrow \equiv Ti-Cl + C_2H_5OH$$
$$\equiv Ti-Cl + H_2O \rightarrow \equiv Ti-OH + HCl$$

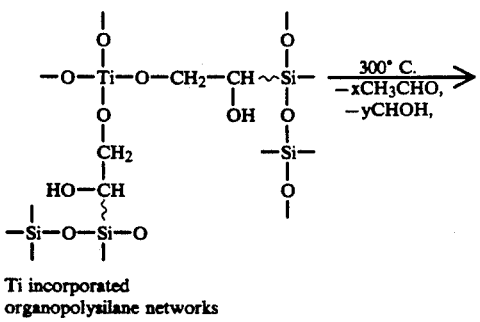

Ti incorporated organopolysilane networks

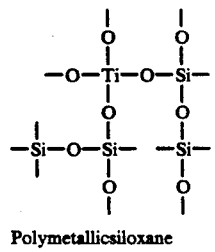

Polymetallicsiloxane

TABLE 2

| GPS/Ti(OC$_2$H$_5$)$_4$ (wt. ratio) | Compositions of clear precursor solutions used for various GPS/Ti(OC$_2$H$_5$)$_4$ ratios | | | | |
|---|---|---|---|---|---|
| | GPS (wt. %) | Ti(OC$_2$H$_5$)$_4$ (wt. %) | CH$_3$OH (wt. %) | Water (wt. %) | HCl (wt. %)/ [GPS + Ti(OC$_2$H$_5$)$_4$ |
| 100/0 | 50 | 0 | 30 | 20 | 10 |
| 80/20 | 40 | 10 | 30 | 20 | 10 |
| 60/40 | 30 | 20 | 30 | 20 | 20 |
| 40/60 | 20 | 30 | 30 | 20 | 30 |

The hydroxylated titania derived from the hydrolysis of Ti(OC$_2$H$_5$)$_4$ appears to react preferentially with the C—Cl groups, rather than the silanol groups (Si—OH). The silanol groups are formed by hydrolysis of the methoxysilane groups in GPS. A possible condensation reaction occurring between the C—Cl in the polymeric organosilanes and the hydroxy groups in the hydrated Ti compounds is shown below:

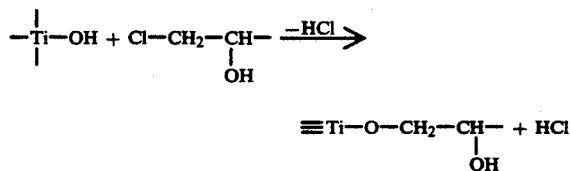

Upon heating to 300° C., a large number of carbon containing groups such as CH$_2$O and CH$_3$CHO are eliminated from the Ti incorporated organopolysilane networks. This can be seen in the following equation:

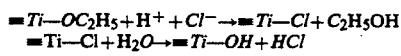

The conversion of the Ti incorporated organopolysilane networks into the polymetallicsiloxane network structure occurs at about 300° C.

At temperatures of about 300° and above, pyrolytic changes in conformation appear to occur. The pyrolytic changes result in the elimination of numerous organic groups from the Ti-incorporated organopolysilane network structures. Once the transition is completed, the Ti elements located in the networks act as a crosslinking agent which connect directly between the polysiloxane chains. The extent of Ti crosslinking depends mainly on the GPS/Ti(OC$_2$H$_5$)$_4$ ratio. Samples for IR analysis were prepared by incorporating the powdered samples into KBr pellets. The presence of Si—O—Ti linkages in the PTS is indicated by an IR absorption peak at approximately 930 cm$^{-1}$. The absorption intensity around 930 cm$^{-1}$ becomes weaker as the proportion of Ti-(OC$_2$H$_5$)$_4$ is increased. This is illustrated in FIG. 1. The presence of the bonds at 930 cm$^{-1}$ illustrates the formation of a polytitanosiloxane film at a low temperature (i.e., less than 1000° C.).

Figure 2:
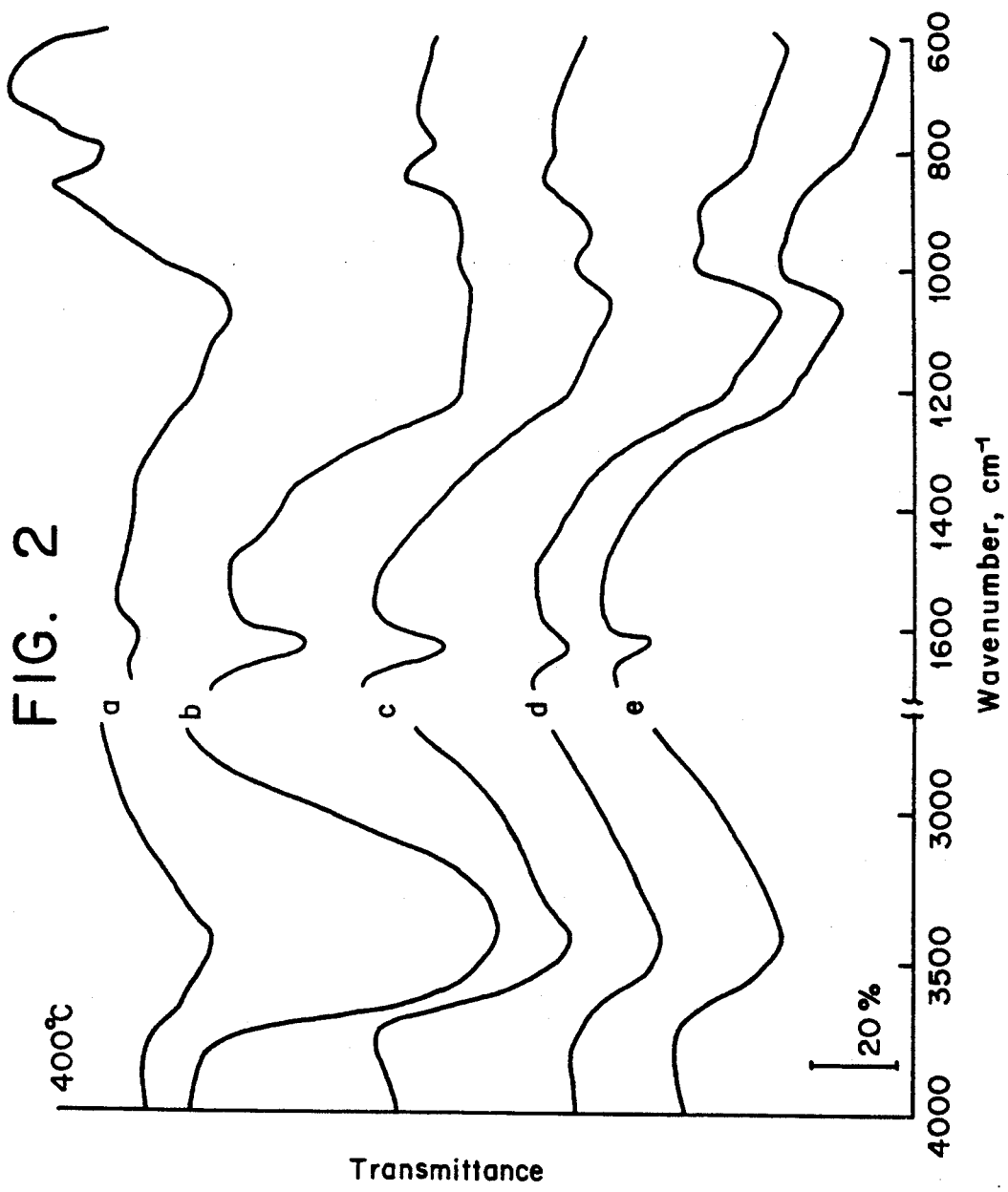
FIG. 2 details the IR absorption spectra for powder samples of various GPS/Ti(OC$_2$H$_5$)$_4$ ratios heated at 400° C.: a) 100/0; b) 80/20; c) 60/40; d) 40/60; and 3) 30/70.

When the heat treatment temperature was increased to 400° C., the peak in the 2900 cm$^{-1}$ region of the IR spectra for all of the GPS samples disappeared. This is shown in FIG. 2 and suggests that all the residual organic compounds were nearly removed from the PTS networks. The spectral features for the 400° C.-treated samples were similar to those for the 300° C.-treated ones with the exception of the disappearance of the 2900 cm$^{-1}$ scale from 400° C. treated sample. Comparing the results at 500° C. (see FIG. 3), with those at 400°

C. (FIG. 2), no specific changes or shifts in the absorption bands for any samples can be seen.

Figure 4A:
FIGS. 4a and 4b illustrate surface morphologies for GPS/Ti(OC$_2$H$_5$)$_4$ coatings treated at 300° C. The micrographs correspond to the following GPS/TI(OC$_2$H$_5$)$_4$ ratios.
Figure 4B:
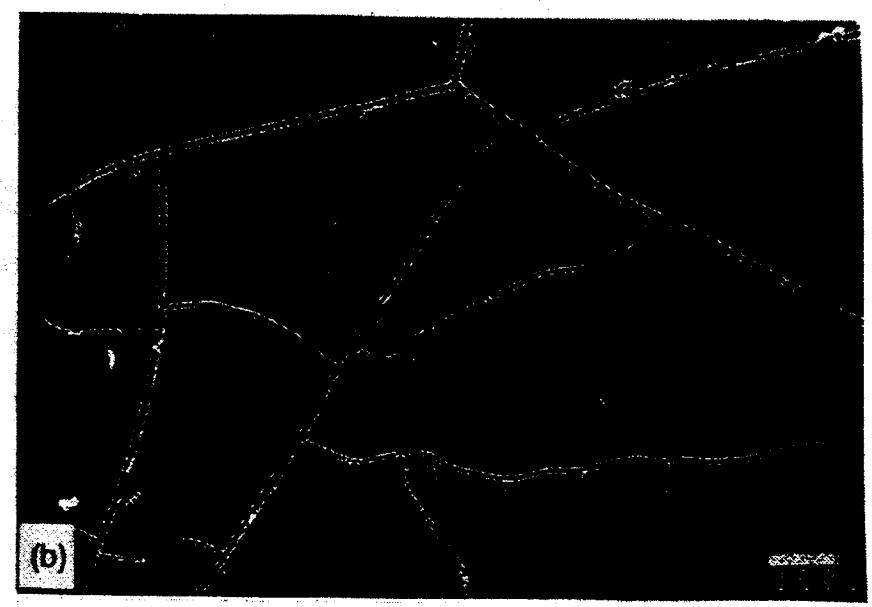

When the film treatment temperature was raised to 300° C., samples containing a GPS/Ti(OC$_2$H$_5$)$_4$ ratio of 100/0 experienced severe damage. This is shown in FIG. 4a. The failure appears to be due to pyrolytic changes in conformation of the polymeric organosilane. These pyrolytic changes result from the elimination of organic species from the network structure and result in excessive shrinkage of the film. The SEM (scanning electron microscope) microstructure view of the 60/40 ratio film (FIG. 4b) disclosed a much lower magnitude in shrinkage and/or stress cracks. This strongly suggests that the cross-linking ability of the Ti compounds, which connect directly between the polysilane chains, acts significantly to suppress the development of stress cracks. It is theorized that the network structure of the PTS polymers, formed by pyrolytically induced conformational changes in Ti compound modified organosilane polymers, contributes to the maintenance of film shape at high temperatures. The amount of cracking can be reduced by diluting the sol gel precursor solution with water. The dilution of the sol gel precursor solution results in the formation of a thinner polymetallicsiloxane coating.

Corrosion protection data for the above-coated substrates were obtained from the polarization curves for PMS coated FPL etched aluminum samples upon exposure to an aerated 0.5M sodium chloride solution at 25° C. The typical cathodic-anodic polarization curves of log current density vs. potential for the coated samples were similar to those reported by several investigators for other materials (G. A. Dibari and H. J. Read, *Corrosion*, 27 (1971) 483; Z. A. Foroulis and M. J. Thubriker, *Electrochim. Acta*, 21 (1976) 225; and A. V. Pocius, in K. L. Mittal (ed.), *Adhesion Aspects of Polymeric Coatings*, Plenum Press, New York, 1983, pp. 173-192).

Figure 5:
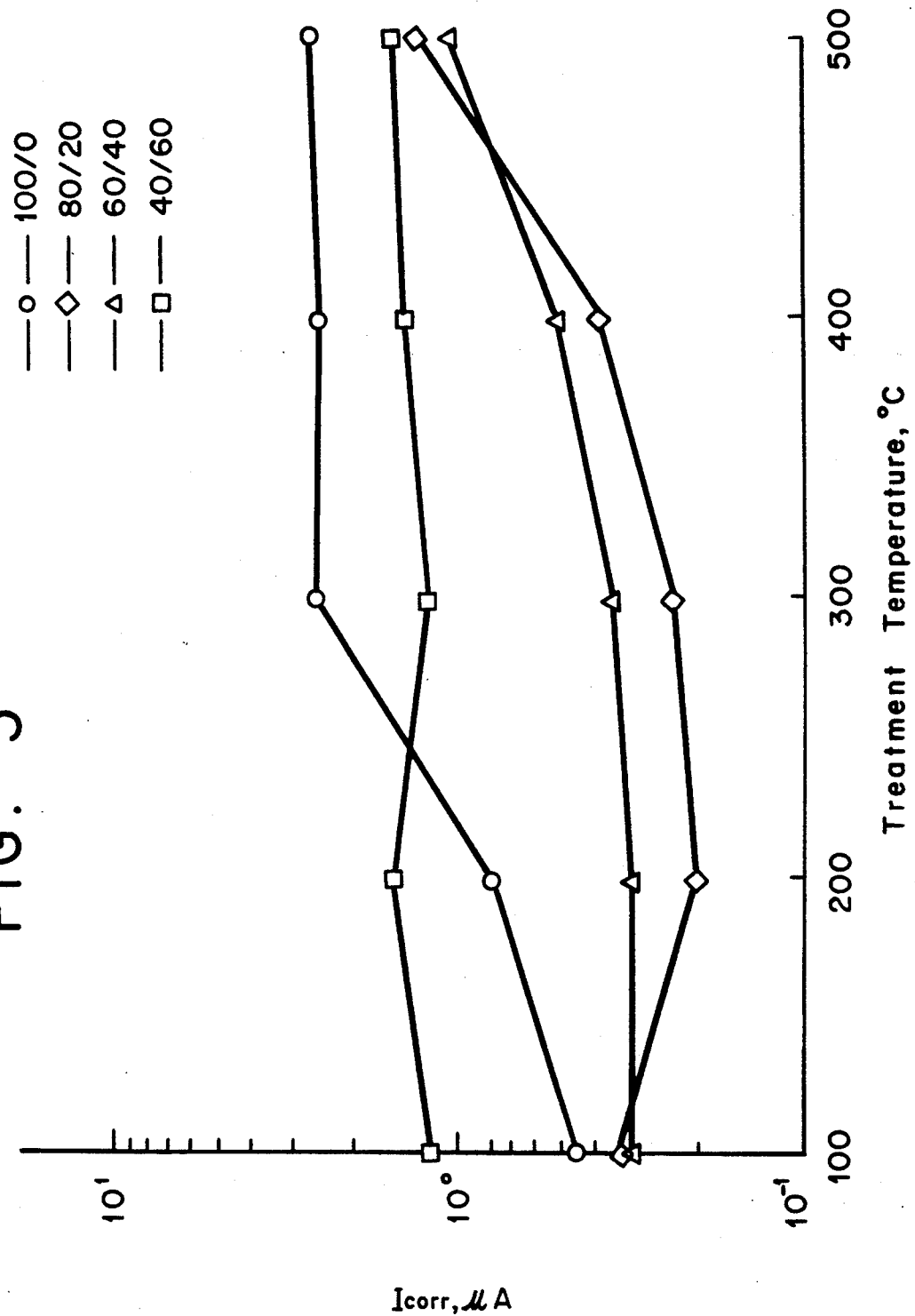
FIG. 5 graphically illustrates the variation in corrosion current (I$_{corr}$) for aluminum substrates coated with various GPS/Ti(OC$_2$H$_5$)$_4$ ratio systems as a function of the film-treatment temperature.

The corrosion protective performance of the coatings was evaluated by an electrochemical procedure involving measurement of the corrosion current, $I_{corr}$, by extrapolation of the cathodic Tafel slope. The variation in the $I_{corr}$ value was plotted as a function of the treatment temperature. These results are depicted in FIG. 5. As seen in FIG. 5, the protective ability of the coatings depends primarily on the GPS/Ti(OC$_2$H$_5$)$_4$ ratio and the treatment temperature. A low $I_{corr}$ value indicates good corrosion protection.

The $I_{corr}$-temperature relations for the 80/20 and 60/40 ratio coatings indicate that although microcracks form on the film surface at temperatures ≥300° C., the $I_{corr}$ values after treatment at 400° C. are almost equal to those for the coatings pretreated at 100° C. This suggests that PTS coating films at 100° C. formed from in-situ conformation changes at 400° C. provided corrosion protection for aluminum.

Ti(OC$_2$H$_5$)$_4$—Modified Organosilanes

Coating of the aluminum surfaces using the sol-gel system was performed in accordance with the following sequence. First, the FPL-etched aluminum substrate was immersed in the precursor solution at ambient temperature. The substrate was then withdrawn slowly and heated for 20 hr at a temperature of 100° C. to yield a solid coating. The samples were subsequently heated for 20 min at temperatures ranging from 200° to 500° C.

A film-forming precursor solution composed of 30 wt % of the particular organosilane, 20 wt % Ti(OC$_2$H$_5$)$_4$, 30 wt % CH$_3$OH and 20 wt % water was employed to produce the PTS polymers. The required concentrations of the HCl hydrolysis promoter needed to prepare clear precursor solutions were dependent upon the species of organosilane, and for the TSPDI system was 30% by weight of total mass of organosilanes and Ti(OC$_2$H$_5$)$_4$.

Figure 6:
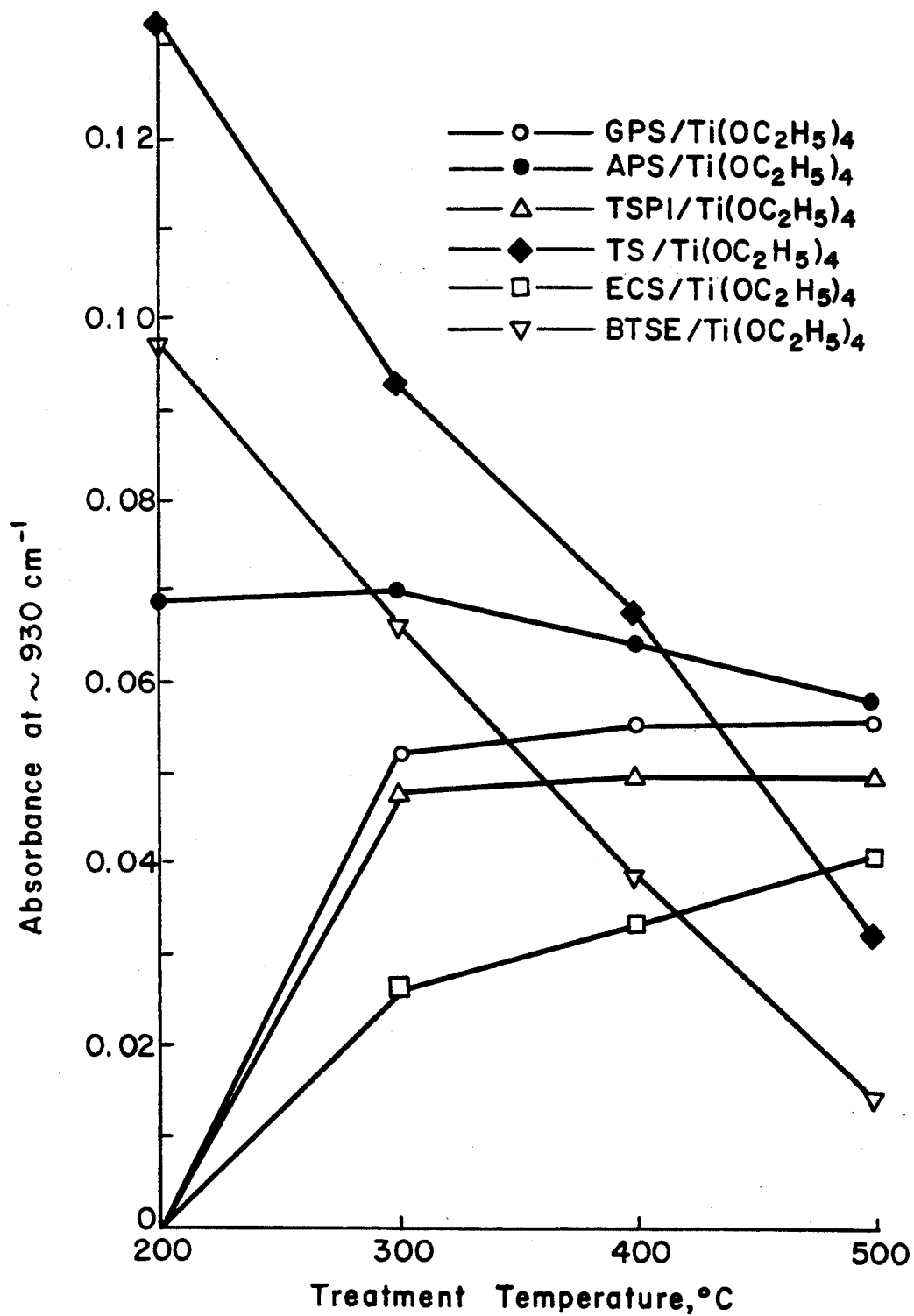
FIG. 6 illustrates the changes in IR absorbance corresponding to the Si—O—Ti bond at approximately 930 m$^{-1}$ for Ti compound-incorporated organosilanes preheated at temperatures within the range of 200° to 500° C.

The presence of Si—O—Ti linkages in the PTS can be readily identified from the IR absorption peak at approximately 930 cm$^{-1}$. The extent of the densification of the Si—O—Ti linkages was estimated by comparing the absorbencies at approximately 930 cm$^{-1}$ for the PTS samples derived from the various organosilane-Ti(OC$_2$H$_5$)$_4$ systems. As previously discussed, samples for the IR analysis were prepared by incorporating the powdered samples into KBr pellets. FIG. 6 summarizes the resulting variations in absorbance plotted as a function of treatment temperature. The data indicates that the extent of densification of Si—O—Ti bonds is dependent upon the reactive organic functional groups attached to the terminal carbon of the methylene chains within the monomeric organosilane structures.

An absorption peak at approximately 930 cm$^{-1}$ was not detected for the 200° C.-treated GPS- and TSPDI-Ti(OC$_2$H$_5$)$_4$ systems. This indicates that a PTS containing a highly densified Si—O—Ti bond was not formed at this temperature. A prominent IR peak at approximately 930 cm$^{-1}$ was observed for the GPS and TSPDI-Ti(OC$_2$H$_5$)$_4$ systems when the samples were heated at 300° C. for 20 min. An absorption peak at approximately 930 cm$^{-1}$ was observed for the 200° C. treated APS-Ti(OC$_2$H$_5$)$_4$ system. This indicates that PTS, containing a highly densified Si—O—Ti bond, was formed at these temperatures. This illustrates the formation of a polymetallicsiloxane coating at a low temperature (i.e., less than 1000° C.). Beyond this temperature, the absorbance value increased slowly, suggesting that the in-situ conversion of the Ti compound-incorporated organosilane polymers into PTS progressively occurs at temperatures ranging from about 200 to about 300° C.

Figure 7B:
FIGS. 7a and 7b detail SEM images for TSPI 7a and APS 7b coating films heated at 200° C.
Figure 7A:

FIG. 7 illustrates the SEM images obtained for coating film surfaces preheated at 200° C. Except for the development of few microcracks, the APS and TSPDI coatings [FIG. 7a and b] exhibit excellent surfaces.

Figure 8A:
FIG. 8a and 8b details the surface morphologies for TSPDI 8a and APS 8b system coatings heat treated at 300° C.
Figure 8B:

The SEM micrographs of these coating systems after being exposed to air for 20 min at 300° C. are shown in FIG. 8. The APS and TSPDI coatings (FIG. 8a and b) showed no film damage with the exception of the appearance of a clear crack line.

Figure 9:
FIG. 9 illustrates the SEM micrograph for the TSPDI coating system heat treated at 300° C.

Heat damage and distortion of the aluminum substrate was apparent, but after heating for 20 min at 500° C., the TSPDI coating was not damaged [See FIG. 9a]. Accordingly, PTS coating films derived from the Ti(OC$_2$H$_5$)$_4$-TSPDI system appear to have the most stable Si—O—Ti bonds in the PTS network structure. This may be due to moderate densification of the Si—O—Ti bonds in the PTS network structure.

The corrosion protective performance of PTS coatings derived from various organosilane-Ti(OC$_2$H$_5$)$_4$ systems was determined by comparing the corrosion current, ($I_{corr}$) values determined from the cathodic Tafel slopes of the various organosilane-Ti(OC$_2$H$_5$)$_4$ systems. The corrosion tests in this study were performed on PTS coatings formed on the FPL-etched aluminum at 300°, 400°, and 500° C. The resultant changes in $I_{corr}$ for these coating specimens are summarized in Table 3.

TABLE 3

| Coating system | $I_{corr}$ value (μA) obtained after pretreatment at | | |
|---|---|---|---|
| | 300° C. | 400° C. | 500° C. |
| GPS-Ti(OC$_2$H$_5$)$_4$ | $3.5 \times 10^{-1}$ | $6.0 \times 10^{-1}$ | 0.5 |
| APS-Ti(OC$_2$H$_5$)$_4$ | $8.5 \times 10^{-2}$ | $5.8 \times 10^{-1}$ | 1.2 |
| TSPDI-Ti(OC$_2$H$_5$)$_4$ | $2.0 \times 10^{-2}$ | $4.6 \times 10^{-1}$ | $9.8 \times 10^{-1}$ |
| TSPI-Ti(OC$_2$H$_5$)$_4$ | $2.5 \times 10^{-2}$ | $4.9 \times 10^{-1}$ | $9.9 \times 10^{-1}$ |

After treatment at 300° C., the lowest $I_{corr}$ value of $2.0 \times 10^{-2}$ μA was measured on the PTS coatings derived from the TSPDI system. The APS system produced the next lowest $I_{corr}$ value. These values were approximately two orders of magnitude less than that for the TS system. The data indicates that the $I_{corr}$ values for all of the PTS coatings formed at ≧300° C. increased as the film treatment temperature was raised. This is probably due to the increased size and number of cracks in the films. PTS coatings derived from the TSPDI system imparted the best corrosion protection, and at 500° C., the $I_{corr}$ value was still on the order of $10^{-1}$ μA.

Ti(OC$_3$H$_7$)$_4$, Zn(OC$_3$H$_7$)$_4$ and Al(OC$_3$H$_7$)$_3$ —Modified Organosilanes The mix compositions for the Ti(OC$_3$H$_7$)$_4$, Zn(OC$_3$H$_7$)$_4$ and Al(OC$_3$H$_7$)$_3$ sol-gel precursor solutions are listed in Table 4. In order to produce a clear precursor solution it was very important to add a chlorine containing acid such as HCl. The chlorine containing acid acted as a hydrolysis accelerator and aided in the formation of a uniform coating film on the metal substrate.

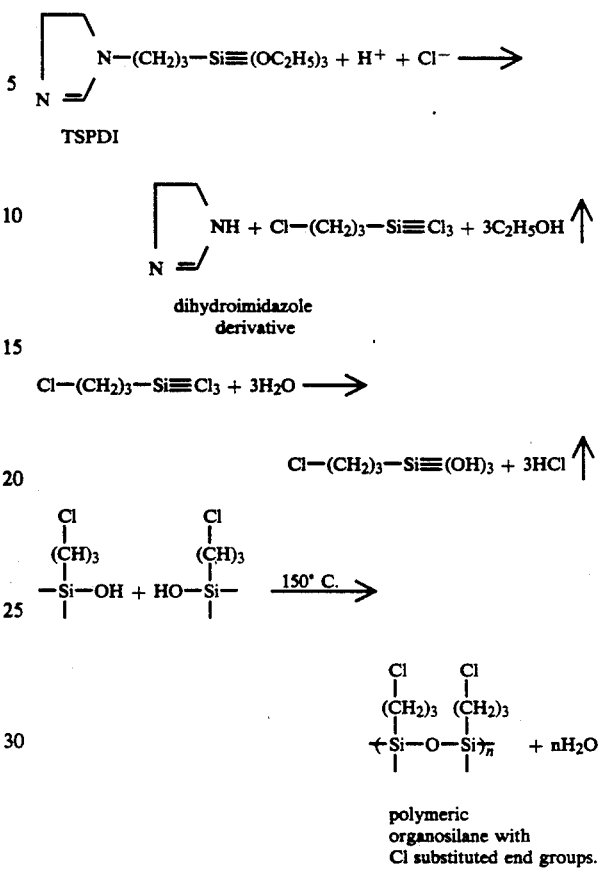

TABLE 4

Compositions of Clear Precursor Solutions Used in Various M(OC$_3$H$_7$)$_n$* - Modified TSPI Systems.

| TSPI/M(OC$_3$H$_7$)$_n$* wt ratio | TSPDI wt % | Zr(OC$_3$H$_7$)$_4$, wt % | Ti(OC$_3$H$_7$)$_4$, wt % | Al(OC$_3$H$_7$)$_3$, wt % | CH$_3$OH, wt % | Water, wt % | HCl, wt %/TSPI + M(OC$_3$H$_7$)$_{4or3}$ |
|---|---|---|---|---|---|---|---|
| 100/0 | 50 | — | — | — | 30 | 20 | 12 |
| 70/30 | 35 | 15 | — | — | 30 | 20 | 20 |
| 50/50 | 25 | 25 | — | — | 30 | 20 | 30 |
| 70/30 | 35 | — | 15 | — | 30 | 20 | 15 |
| 50/50 | 25 | — | 25 | — | 30 | 20 | 25 |
| 70/30 | 35 | — | — | 15 | 30 | 20 | 40 |
| 50/50 | 25 | — | — | 25 | 30 | 20 | 50 |

*M: Zr, Ti and Al
n: 3 or 4

The substrates were coated by immersing an FPL-etched aluminum substrate into the precursor solution at ambient temperature. The substrate was then withdrawn from the precursor solution. Next, the substrate was heat treated at 150° C. for 20 hrs. The 150° C. heat treatment results in the removal of water and methanol from the precursor solution coating and produces a sintered coating. The substrates coated with the Ti(OC$_3$H$_7$)$_4$ and Zn(OC$_3$H$_7$)$_4$ sol-gel precursor solutions were heated for 30 minutes at 350° C. to form polyzirconicsiloxane and polytitanosiloxane coatings. The substrates coated with the Al(OC$_3$H$_7$)$_3$ sol-gel precursor solutions were heated for 30 minutes at 200° C. to form a polyaluminosiloxane coating.

The HCl catalyzed hydrolysis-polycondensation reaction occurred in the following manner:

It is believed that the hydroxyl groups derived from the HCl-catalyzed hydrolysis of Zr(OC$_3$H$_7$)$_4$ and Ti(OC$_3$H$_7$)$_4$, react preferentially with the Cl in Cl-substituted end groups in the silane compound, rather than the silanol groups which are formed by hydrolysis of the ethoxysilyl groups in the TSPDI. The proposed reaction mechanism for this is shown below:

$$\equiv M-OH + Cl-(CH_2)_3-Si\equiv(OH)_3 \xrightarrow{150° C.}$$

-continued

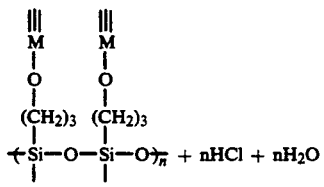

polymeric organosilane
with oxygen-briged Zr or Ti $+ nHCl + nH_2O$

Where M = Zr or Ti.

It is believed that the reaction of the halide with the OH in the hydroxylated metals favors the elimination of hydrogen chloride. The formation of Cl-terminated end groups plays an important role in creating the M—O—C linkages.

The reaction process for the $Al(OC_3H_7)_3$/TSPDI system is different than those of the $Ti(OC_3H_7)_4$/TSPDI and $Ti(OC_3H_7)_4$/TSPDI systems. A polymeric organoaluminosilane network is formed when the $Al(OC_3H_7)_3$/TSPDI system is heated to 150° C. and is believed to have the following structure:

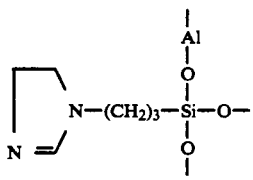

Figure 10:
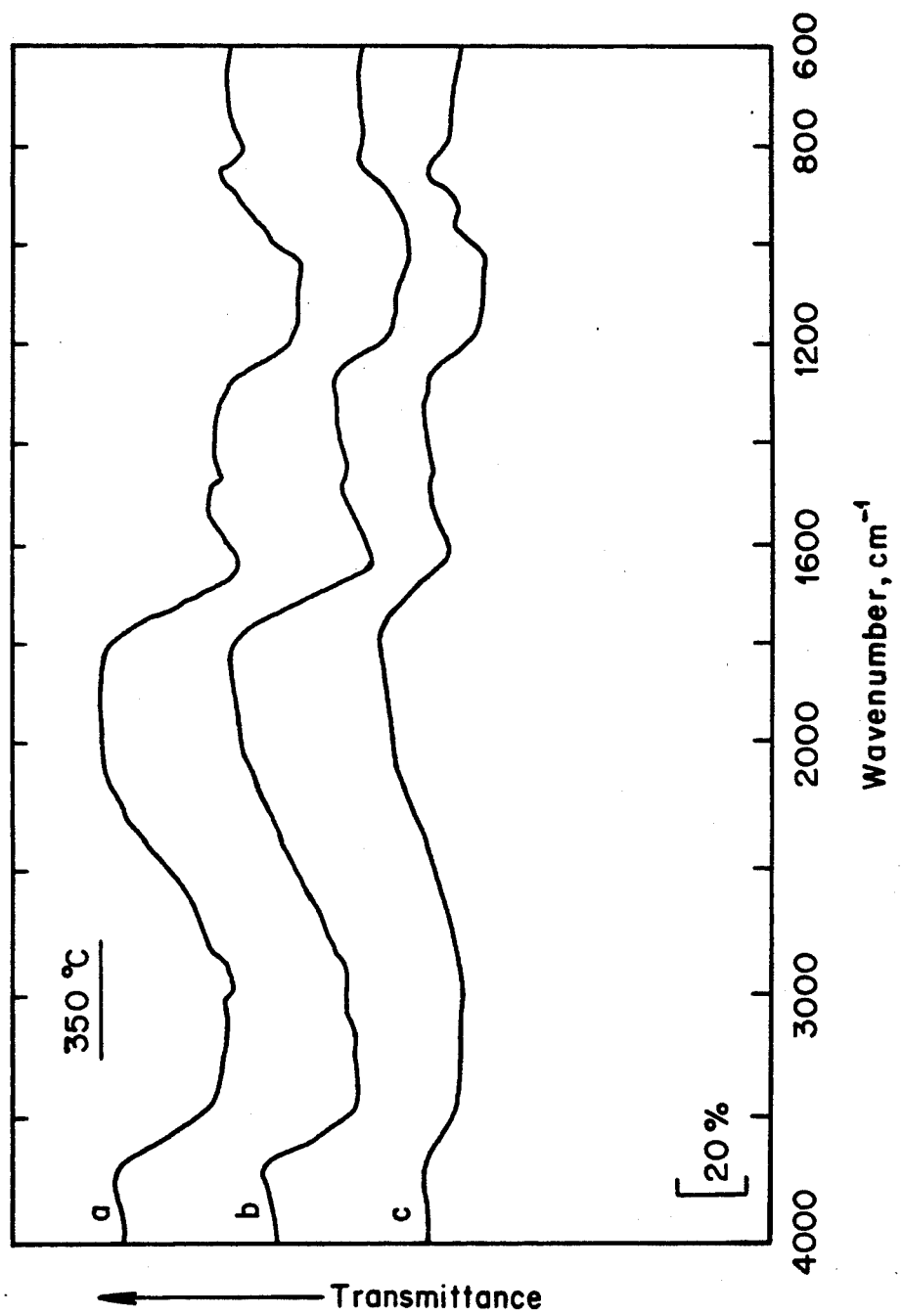
FIG. 10 illustrates the IR spectra for 350° C.-annealed TSPDI/M(OC$_3$H$_7$)$_3$ or 4 for the (a) 100% TSPDI, (b) TSPDI/Zr(OC$_3$H$_7$)$_4$ (50:50 ratio) and (c) TSPDI/Ti(OC$_3$H$_7$)$_4$ (50:50 ratio) systems.

IR studies were performed on the $Ti(OC_3H_7)_4$/TSPDI and $Zr(OC_3H_7)_4$/TSPDI samples after they had been heated for 30 minutes in air at 350° C. The samples had previously been heated at 150° C. for 20 hours. The IR analyses were conducted using the KBr method which incorporates the powder samples of 2 to 3 mg into KBr pellets of approximately 200 mg. FIG. 10 illustrates the IR spectra for a) 100% TSPDI, b) TSPDI/$Zr(OC_3H_7)_4$ (in a 50:50 ratio) and c) TSPDI/$Ti(OC_3H_7)_4$ (in a 50:50 ratio) samples heat treated at 150° C. for 20 hours and 350° C. for 30 minutes. The presence of a polymetallicsiloxane is indicated by an IR peak within the area of about 910 cm$^{-1}$ to about 960 cm$^{-1}$.

The TSPDI/$Zr(OC_3H_7)_4$ system (FIG. 10(b)) had an IR peak at 950 cm$^{-1}$. The TSPDI/$Ti(OC_3H_7)_4$ system (FIG. 10c) had an IR peak at 930 cm$^{-1}$. These peaks signify the formation of polymetallicsiloxane, at a low temperature (i.e., less than 1000° C.), by the process shown below:

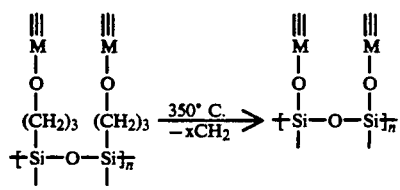

Where M = Zr or Ti

The 350° C. heating results in the elimination of numerous organic groups permitting the Zr and Ti metal oxides to act as crosslinking agents which connect the polysiloxane chains to form polyzirconicsiloxane and polytitanosiloxane.

Characteristics of PMS (Coating Films Derived From TSPDI/$Ti(OC_3H_7)_4$, TSPDI/$Zr(OC_3H_7)_4$ and TSPDI/$Al(OC_3H_7)_3$ Precursor Systems Thin coating films were obtained by diluting 20 g of the precursor solutions listed in Table 4 with 80 g of deionized water. The FPL-etched aluminum substrate was immersed into the diluted precursor solution. The substrate was withdrawn from the solution and heated for 20 hours at 150° C. The sintered samples were then heated at 350° C. for 30 minutes to form the pyrolysis induced PMS coating films. The thickness of the PMS film deposited on the substrate was determined using a surface profile measuring system. The average thickness of the films derived from the precursor solution consisting of 100/0, 70/30, and 50/50 TSPDI/M-$(OC_3H_7)_3$ or 4 ratios, ranged from approximately 0.2 to approximately 0.4 μm.

Figure 11:
FIG. 11 illustrates the polyzirconicsiloxane (PZS) film derived from the 70/30 TSPDI/Zr(OC$_3$H$_7$)$_4$ sol-gel solution.

FIG. 11 illustrates the polyzirconicsiloxane (PZS) film derived from the 70/30 TSPDI/$Zr(OC_3H_7)_4$. This PZS film had relatively few microcracks. The amount of cracking can be reduced by diluting the sol gel precursor solution with water. The dilution of the sol gel precursor solution results in the formation of a thinner polymetallicsiloxane coating.

Figure 12B:
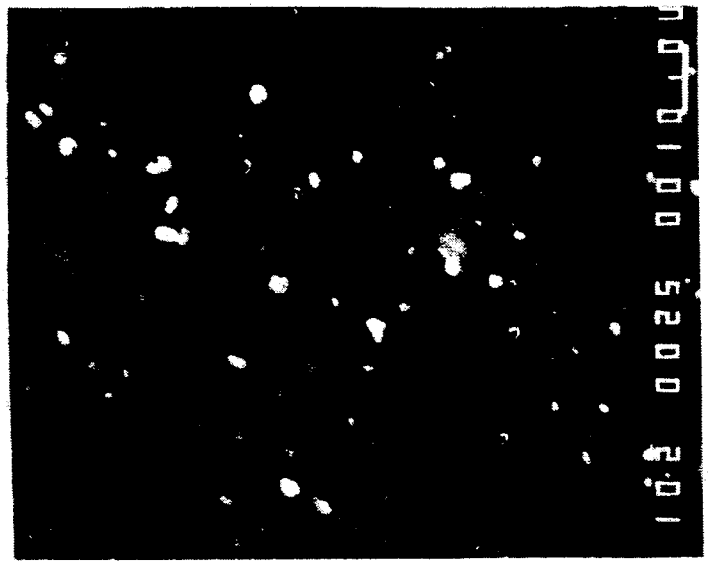
FIGS. 12a and 12b illustrate surface features of pyrolysis-induced PTS coating films.
Figure 12A:

Ideally, a PMS coating surface will have a uniform film free of cracks and pits. These characteristics were observed in the 50/50 TSPDI/$Ti(OC_3H_7)_4$ ratio derived polytitanosiloxane (PTS) film illustrated in FIG. 12a. FIG. 12b illustrates the 70/30 TSPDI/$Ti(OC_3H_7)_4$ ratio derived PTS film. The 70/30 ratio film has a few microcracks. A thinner polymetallicsiloxane coating may be produced by diluting the sol gel precursor solution with water.

Corrosion protection data for the polytitanosiloxane and polyzirconicsiloxane coated substrates were obtained from the polarization curves for PMS coated FPL etched aluminum samples upon exposure to an aerated 0.5M sodium chloride solution at 25° C. To evaluate the protective performance of the coatings, the corrosion potential ($E_{Corr}$) and corrosion current ($I_{Corr}$) were determined for the polarization curves. $E_{Corr}$ is defined as the potential at the transition point from cathodic to anodic polarization curves. $I_{Corr}$ values were measured by extrapolation of the cathodic Tafel slope. These results are summarized in Table 5.

TABLE 5

Corrosion Potential, $E_{corr}$ and Corrosion Current, $I_{corr}$, Values for PMS-Coated and Uncoated Aluminum Specimens.

| Coating Systems, (TSPI/M(OC$_3$H$_7$)$_{4or3}$) | $E_{coor}$* | $I_{corr}$ μA |
|---|---|---|
| Uncoated (blank) | −0.725 | 2.5 |
| PS (100/0) | −0.695 | 1.8 |
| PZS (70/30) | −0.625 | 7.8 × 10$^{-1}$ |
| PZS (50/50) | −0.710 | 1.5 |
| PTS (70/30) | −0.589 | 1.8 × 10$^{-1}$ |
| PTS (50/50) | −0.596 | 1.6 × 10$^{-1}$ |

As seen, the major effect of these PMS coatings on the corrosion protection of aluminum is to move the $E_{Corr}$ value to less negative potentials and to reduce the cathodic current ($I_{corr}$).

The samples coated with PTS produced significantly higher $E_{Corr}$ values, and significantly lower $I_{Corr}$ values, than the uncoated samples. This strongly suggests that the PTS coating films will serve to provide good corrosion resistance from a sodium chloride solution and will minimize the corrosion rate of the aluminum.

Thus, while there have been described what are the presently contemplated preferred embodiments of the present invention, those skilled in the art will realize that changes and modifications may be made thereto without departing from the scope of the invention, and it is intended to claim all such changes and modifications as fall within the true scope of the invention.

I claim:

1. A method of preparing a polymetallicsiloxane coating on a substrate comprising:
   (a) coating the substrate with a solution comprising a monomeric organoalkoxysilane, containing an imidazole group, a metal alkoxide and a chlorine containing acid in an alcohol/water medium;
   (b) heating the coated substrate for a time sufficient and at a temperature sufficient to yield a solid coating; and
   (c) further heating said substrate for a time sufficient and at a temperature sufficient to produce a polymetallisiloxane coating upon said substrate.

2. The method of claim 1 wherein the alcohol is selected from the group consisting of methanol, ethanol and propanol.

3. The method of claim 1, wherein the acid is HCl.

4. The method of claim 1 wherein the metal alkoxide is of the formula $M(OR)_n$, wherein M is a suitable transition metal; R is $CH_3$, $C_2H_5$ or $C_3H_7$, and, n is 3 or 4.

5. The method of claim 4 wherein M is Ti, Ge, Zr or Al.

6. The method of claim 1 further comprising adjusting the solution to have a pH of about 7.5.

7. The method of claim 6 wherein said pH is adjusted by adding NaOH or KOH.

8. The method of claim 1 wherein said step (b) is performed at a temperature of about 100° C. to about 150° C. for a time about 20 hours.

9. The method of claim 1 wherein said step (c) is performed at a temperature of about 200° C. to about 350° C. for a period of about 20-30 minutes.

10. The method of claim 1 wherein the monomeric organoalkoxy silane is selected from the group consisting of N(3-(triethoxysilyl) propyl) imidazole and N(3-(triethoxysilyl) propyl)-4,5-dihydroimidazole.

11. The method of claim 4 wherein the metal alkoxide is selected from the group consisting of $Ti(OC_2H_5)_4$, $Ti(OC_3H_2)_4$, $Zr(OC_3H_7)_4$ and $Al(OC_3H_7)_3$.

12. The method of claim 2 wherein the alcohol is methanol.

13. The method of claim 1 wherein the solution used in step (a) has a ratio of monomeric organoalkoxysilane to metal alkoxide in the range of about 80/20 to about 50/50 by weight.

14. The method of claim 1 wherein the solution has the following weight percentages of substituents, 18-35 wt % N[3-(triethoxysily)propyl]imidazole 9-18 wt % $Ti(OC_2H_5)_4$, 21-26 wt % methanol, 13-29 wt % HCl and 14-17 wt % water.

15. The method of claim 1 wherein the solution has the following weight percentages of substituents 18-35 wt % N[3-triethoxysilyl)propyl]4,5dihydroimidazole monomer, 9-18 wt % $Ti(OC_2H_5)_4$, 21-26 wt % methanol, 13-29 wt % HCl and 14-17 wt % water.

* * * * *